Aug. 5, 1969  R. J. HOLTON  3,459,094
FASTENERS
Original Filed Jan. 13, 1965  2 Sheets-Sheet 1
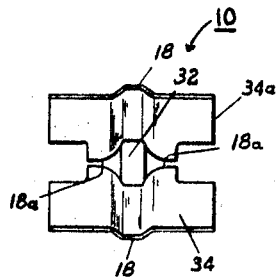
Fig. 1
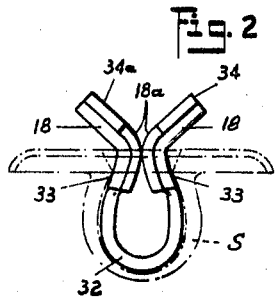
Fig. 2
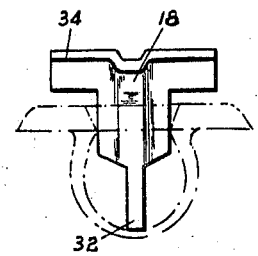
Fig. 3
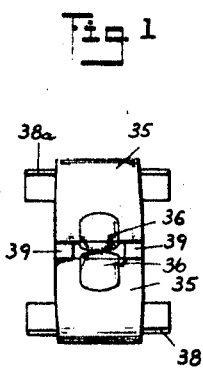
Fig. 4
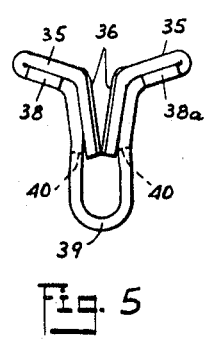
Fig. 5
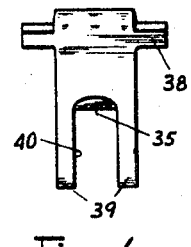
Fig. 6
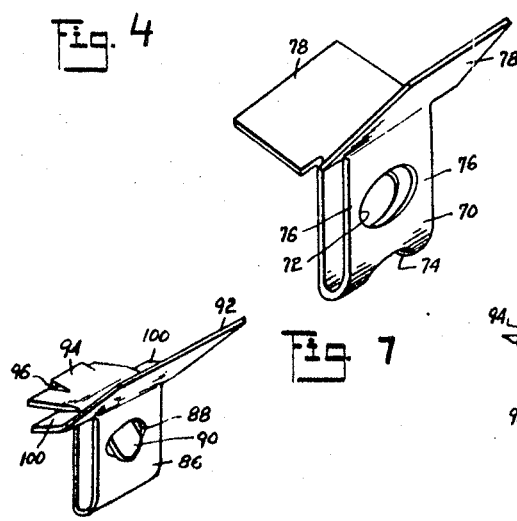
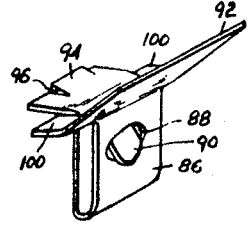
Fig. 7
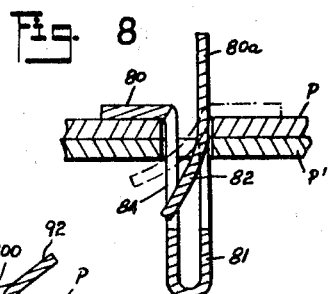
Fig. 8
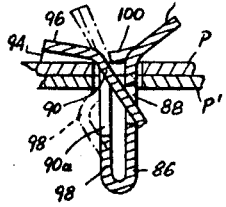
Fig. 10
Fig. 9
INVENTOR.
ROBERT J. HOLTON
BY Teare, Teare & Sammon
ATTORNEYS Aug. 5, 1969   R. J. HOLTON   3,459,094
FASTENERS
Original Filed Jan. 13, 1965   2 Sheets-Sheet 2
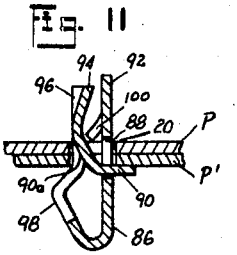
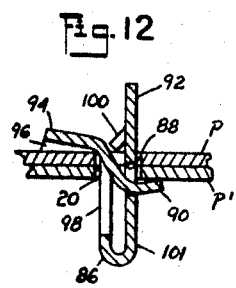
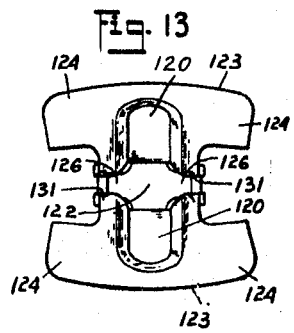
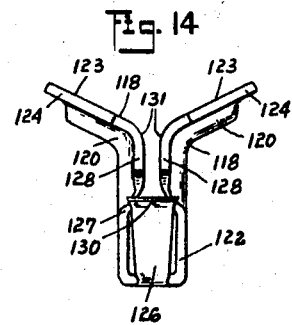
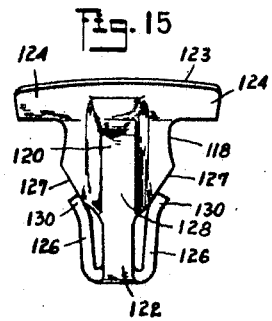
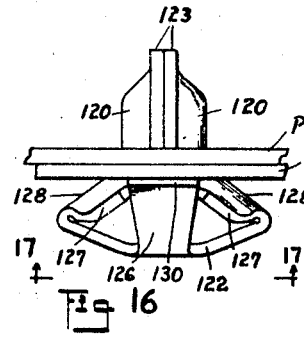
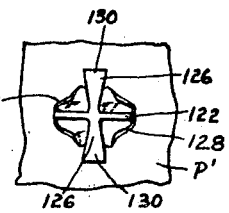
INVENTOR.
ROBERT J. HOLTON
BY
ATTORNEYS United States Patent Office 3,459,094
Patented Aug. 5, 1969

3,459,094
FASTENERS
Robert J. Holton, Rocky River, Ohio, assignor to Tinnerman Products, Inc., Cleveland, Ohio, a corporation of Ohio
Original application Jan. 13, 1965, Ser. No. 425,124, now Patent No. 3,303,542, dated Feb. 14, 1967. Divided and this application May 31, 1966, Ser. No. 554,069
Int. Cl. F16b 19/00
U.S. Cl. 85—5                                    12 Claims

ABSTRACT OF THE DISCLOSURE

A fastener for insertion in an opening in a support member. The fastener comprises a generally vertically oriented loop-like body portion, a pair of tab portions projecting upwardly from the body portion, fulcrum areas disposed adjacent the juncture of the body portion with the tab portions and resilient legs extending upwardly from the body portion and disposed transversely thereof. Upon pivotal movement of the tab portions relative to one another, the body portion is deformed into locking engagement with the support member.

---

This invention relates in general to fastening means and more particularly to malleable, deformable fasteners for securing two or more members together, such as a pair of supporting panels, or for the securing of a molding or the like to one or more panels. This is a divisional application of the pending United States patent application of Robert J. Holton, Ser. No. 425,124, filed Jan. 13, 1965, now Patent No. 3,303,542, which is based on the parent United States patent application Ser. No. 258,494, filed Feb. 14, 1963, now Patent No. 3,208,122.

The fastener means of the instant invention is adapted to be used in place of sheet metal screws, or nut and bolts, and may be expeditiously and readily applied to a panel, and secured thereto, and will effectively couple together the two or more members, which are to be attached.

Summary of the invention

A fastening device adapted for insertion in an opening in a support member, said device comprising a generally vertically oriented loop-like body portion adapted to be received through the opening in said support member, a pair of tab portions projecting upwardly and outwardly from said body portion, said tab portions being adapted for engagement with one side of said support member, means including fulcrum areas disposed adjacent the bent juncture of said body portion with said tab portions, said fulcrum areas being disposed in spaced confronting relationship to provide outward deformation of said body portion upon pivotal movement of said tab portions toward one another, and resilient leg means extending upwardly from adjacent the bottom of said body portion and disposed generally transversely thereof, said leg means being adapted for co-acting engagement with the confronting surface of the other side of said support member upon said deformation of said body portion.

Accordingly, it is an object of the instant invention to provide a deformable fastener, which may be readily inserted through aligned openings in two or more members, or through an opening in any one of the members, and deformed to a holding position, for securely attaching the members together.

Another object of the instant invention is to provide various forms of fasteners for tying or fastening together a pair of members, such as a pair of superimposed panels, and wherein the fastener comprises a comparatively small, inexpensive member of malleable sheet metal, which fastener is adapted to extend through apertures in the panel members, and to be deformed when in such aperture, into secure engagement with the panel members.

Another object of the instant invention is to provide a malleable sheet metal fastener, adapted to secure a pair of members together, such as for instance, a pair of panel members having aligned apertures therein, and wherein the fastener comprises a loop-like body portion, adapted to extend through the apertured panels, and a pair of tab portions connected to the body portion and projecting therefrom, and wherein the fastener is adapted to be deformed upon relative movement between the tab portions, such movement causing deformation of the body portion, for securing the fastener to the panel members.

A more specific object of the instant invention is to provide a fastener of the character described wherein the tab portions extend outwardly from one another and wherein there is provided fulcrum means on the fastener adapted for coaction upon movement of the tab portions toward one another, to facilitate deformation of the loop-like body portion into secured relation on the supporting members.

Other objects and advantages of the invention will be apparent from the following description taken in conjunction with the accompanying drawings wherein:

FIG. 1 is a top plan view of a fastener constructed in accordance with the instant invention;

FIG. 2 is an end elevational view of the fastener illustrated in FIG. 1, and showing in phantom lines a resilient cap-like sealing member assembled therewith for sealing the receiving aperture in a panel;

FIG. 3 is a side elevational view of the fastener illustrated in FIGS. 1 and 2, and further showing in phantom lines the resilient sealing member mounted thereon;

FIG. 4 is a top plan view of a modification of the fastener;

FIG. 5 is an end elevational view of the fastener of FIG. 4;

FIG. 6 is a side elevational view of the fastener of FIGS. 4 and 5;

FIG. 7 is a generally perspective view of a further modification of the fastener;

FIG. 8 is a sectioned, elevational view showing a further modification of the fastener as mounted on a pair of apertured panels; in phantom lines there is illustrated the deformed position of the fastener for securing the panels together;

FIG. 9 is a generally perspective view of a still further modification of the fastener;

FIG. 10 is a sectional view of the fastener of FIG. 9 as mounted in the aperture of a panel, and ready for deformation into secured position on the panel; the phantom lines illustrating this deformed position;

FIG. 11 is a sectional view of the fastener of FIG. 9 utilizing an alternate method of installing the fastener for securement to a panel or panels, and illustrating the position of the fastener after it has been deformed into secured relation on the panel;

FIG. 12 is a sectional view of the fastener of FIG. 9 as mounted in the apertures in the panels, and illustrating another alternate method for installing the fastener with the panels, and illustrates the deformed position of the fastener in secured relation on the panel;

FIG. 13 is a top plan view of a still further modification of the fastener;

FIG. 14 is an end elevational view of the fastener in FIG. 13;

FIG. 15 is a side elevational view of the fastener of FIGS. 13 and 14;

FIG. 16 is an end elevational view of the fastener of FIGS. 13 to 15, as mounted in deformed condition on a pair of apertured panels, and securing the panels together; and FIG. 17 is a reduced size, bottom view of the fastening arrangement of FIG. 16 and taken along the plane of the line 17—17 of FIG. 16, looking in the direction of the arrows.

Referring now again to the drawings and in particular to FIGS. 1 to 3 thereof, there is shown a fastener or clip 10 comprising a generally vertically oriented, loop-like body portion 32, having outwardly divergent, generally T-shaped sections defining tabs 34 and 34a for readily actuating the fastener to deform the loop-like body portion 32 into secured relationship on an apertured support panel or the like. The fastener 10 may be formed from a single piece of deformable, malleable material, such as for instance sheet metal, and for example cold rolled steel. Such malleable metal possesses the characteristics that it may be generally permanently deformed upon application of a predetermined force, as distinguished from a purely spring-type metal which when bent will generally return to its original position upon removal of the bending or distorting force.

The clips of the present invention may be formed from blanks having outlines of paired, generally T-shaped configurations connected together by the loop-like body portion 32 which is of a reduced transverse width compared to the transverse width of the tabs 34 and 34a. As can best be seen in FIGS. 1 and 2, the generally angular T-shaped sections of the clip are preferably deformed or embossed outwardly, as at 18, to add strength to the clips in that area, and also to provide confronting fulcrum portions 18a (FIG. 2) adapted for engagement against one another upon movement of the tabs 34 and 34a toward one another to deform or collapse the loop-like body portion 32 into secured relation with a panel.

In FIGS. 1 and 2 it can be seen that the loop-like body portion 32 is of a substantially lesser width as compared to the width of the generally T-shaped portions of the clip, and of a lesser width than even the embossed ribs 18 formed by deformation of the T-shaped sections of the clip. Accordingly, upon application of inward pressure on the tabs 34 and 34a, as for instance by a pair of pliers operated by a workman, the confronting fulcrum portions 18a engage one another upon pivoting of the tabs 34 and 34a toward one another to cause spreading deformation of the loop-like body portion 32 into secured relationship with a panel or panels. A pair of support panels are illustrated at P and P' of FIG. 16.

In this form, loop-like body portion 32 of the clip 10 is of a generally elliptical or arcuate configuration, in elevation, adapted for holding coaction with a resilient, cap-like member S, which is constructed and arranged to receive the loop-like body portion 32 of the clip in the interior of the resilient cap, and to coact therewith, as at 33, in maintaining such resilient sealing member in assembled condition with the fastener. Reference may be had to United States Patent Nos. 2,924,864 and 2,995,790, issued February 16, 1960, and August 15, 1961, respectively, to Robert J. Holton, for a more detailed description of the resilient sealing members which may be utilized with the clip. During deformation of the clip caused by movement of the tabs 34 and 34a toward one another, the loop-like body portion 32 is deformed and thereby also deforming the resilient sealing member S and urging it into positive sealing relation, in the aperture provided in the panel, thus preventing the entry or movement through the aperture of moisture, dust, foreign matter or the like. It will be noted that in FIGS. 1 to 3, the embossed ribs 18 extend fully to the uppermost extremity of the tabs 34 and 34a and do not terminate short of such extremities.

The openings or apertures in the panels through which the fastener or clip extends may be of any desired configuration but are preferebly of a generally circular configuration and of which is usually the most economical type of opening to provide, and the fastener is initially easily received through such aperture preparatory to deforming the same into secured position on a panel. The laterally projecting T-shaped sections defining the tabs 34 and 34a are adapted to engage the uppermost surface of the panel, and the collapsing of the loop-like body portion 32 causes the embossments of ribs 18 to cam against the defining boundary of the aperture on the opposite or under side of the panel, thereby to urge the panels together when two or more of the panels are disposed in superimposed relationship. It will be noted that substantially all deformation of the clip or fastener occurs in the loop-like body portion 32. Once the fastener is deformed into its secured relation on a panel or panels, the loop-like body portion 32, which has been deformed into a more or less linear configuration, acts as a beam extending between the T-shaped sections defining the tabs 34 and 34a and thus assures that the fastener is maintained in secured relation on the panels to positively secure them together. It will be seen therefore that such clip or fastener arrangement can readily be utilized for attaching panels of various thicknesses together.

The fastener of FIGS. 4, 5 and 6 includes return bent end portions 35 which are bent back against the respective T-shaped section of the fastener, and are provided with inwardly facing embossments 36, which coact with one another as fulcrums upon predetermined movement of the winged tabs 38, 38a toward one another. It will be seen that the body portion in this instance is formed by severing out, as at 40, the central section of the loop-like body portion. As best shown in FIGS. 5 and 6, it is preferable that the return bent ends 35 extend below the uppermost extremity of the respective aperture 40 defined between the deformable strap portions 39 of the fastener. This increases the deformability or collapsibility of the body section, making it easier to secure the fastener onto a supporting panel or part.

FIG. 7 discloses a further embodiment of the fastener wherein the body section 70 of the fastener is provided with a predetermined size of apertures 72 therethrough, and also is beveled or recessed outwardly as at 74, to separate and weaken the side walls of the U-shaped body portion of the fastener, to thereby greatly facilitate the outward collapsing of the loop along the bend areas 76 upon movement of the head tabs 78 toward one another. As can be readily seen the fastener of FIG. 7 is extremely simplified, and readily lends itself to mass production procedures.

FIG. 8 discloses a fastener wherein the head tabs 80, 80a which may be of the exterior configuration of those of FIG. 7, are disposed angularly with respect to one another, one extending generally vertically while the outer (80) is extending in more of a horizontal or longitudinal direction, and wherein the body section 81 is partially severed to provide an inwardly projecting tongue 82 on one side thereof, and the body section is apertured or severed to provide an opening 84 on the other side thereof, in confronting relationship with the tongue and receives the tongue therein so that the fastener as shown can be generally inserted into apertures in a pair of supporting panels P, P'. Upon deformation of the vertical tab 80a, this causes the deformation of the tongue upwardly to the phantom lines position illustrated, thereby locking the fastener to the underside of the supporting panel P'.

FIGS. 9 and 10 disclose a generally U-shaped fastener wherein one side of the fastener body section 86 is provided with an aperture 88 therein and receives a tongue 90 partially severed as at 90a from the other side of the fastener. One, 92 of the head tabs of the fastener is preferably generally obliquely disposed, as shown, and the other, 94 of the tabs is deformed upwardly preferably centrally thereof, as at 96, so that it can be readily grasped with a pair of pliers or other like tool in the deformation of such tab 94 toward the other tab 92. The tongue 90 acts as an anchor and upon upward movement of the tab 94 toward the other tab 92 collapsing of the weaker side 98 of the fastener into the generally phantom line position illustrated occurs, thereby causing deformation of the body portion of the fastener and securement of the fastener to the supporting panel and causing locking of the two panels together. It will be noted that wings 100 on tab 92 are adapted for engagement with the confronting panel P adjacent the fastener receiving apertures through the panels.

FIG. 11 shows an alternate method of deforming the fastener of FIG. 9 and securing it to the supporting panels P, P'. In this arrangement, both tabs 92 and 94 are deformed toward one another, thereby causing collapsing of the weaker side 98 of the fastener which has a substantial portion of the material thereof removed, and into the protruding holding position illustrated with respect to panel P', while causing some upward movement of tab 92 in attempting to pull the fastener body through the opening in the panel, as such tab pivots on wings 100, and resulting in some lengthwise movement of the tongue 90 and generally into engagement with the underside of the panel P'.

FIG. 12 illustrates another alternate method of deforming the fastener of FIG. 9, and in this arrangement, only tab 92 is deformed upwardly to the general position illustrated, such bending of tab 92 causing some movement of side 101 of the fastener toward side 98 and causing wings 100 on the tab to tend to pull the fastener body 86 up through the panel hole, resulting in deformation of the tongue 90 in the general manner illustrated. In this arrangement, since substantially all of the force on the body 86 is exerted upwardly, no collapsing of the weaker side 98 of the fastener body occurs.

FIGS. 13 through 17 disclose a further embodiment of fastener which is generally similar to that shown for instance in FIGS. 1 through 3, and comprising generally confronting T-shaped portions 118, including the outwardly directed boss or rib portions 120, and a loop-like depending portion 122, with the tabs 123 including the wings 124 thereon, adapted to engage the confronting surface of the panel, for restricting movement of the fastener through the opening in the panel or panels in one direction. However, in this embodiment, there is additionally provided panel engaging legs 126 integrally formed with the loop portion 122, and extending upwardly into engagement with the diagonal surfaces 127 on the sides of the lever sections 128 of the T-shaped portions. Such panel engaging legs have generally widened and diagonally oriented top portions 130, as best shown in FIGS. 14 and 15, and upon pivoting of the tab portions 123 of the fastener toward one another on fulcrum surfaces 131, to cause outward movement of the lever sections 128 of the T-shaped portions away from one another, and thus deformation of the loop portion 122, the upper ends of the legs 126 outwardly with respect to the loop portion 122, and generally transversely of the movement of lever sections 128 to the position illustrated in FIGS. 16 and 17. Such a fastener is an extremely high strength fastener and can resist considerable force applied to separate the secured panels P, P'. In other respects, the fastener of FIGS. 13 through 17 may operate substantially identically to that of FIGS 1 through 3.

From the foregoing description and accompanying drawings, it will be seen that the invention provides a deformable fastener which is adapted to be inserted through an aperture or opening in a supporting member such as for instance a panel or panels, and which is adapted to be deformed into a holding position for securely attaching two or more members together. The invention also provides a fastener which comprises a loop-like body portion and a pair of actuating tabs movable with respect to one another to cause deformation of the body portion into a locking condition on an apertured support panel.

The terms and expressions which have been used are used as terms of description, and not of limitation, and there is no intention in the use of such terms and expressions of excluding any equivalents of any of the features shown or described, or portions thereof, and it is recognized that various modifications are possible.

I claim:

1. A fastening device adapted for insertion in an opening in a support member, said device comprising a generally vertically oriented loop-like body portion adapted to be received through the opening in said support member, a pair of tab portions projecting upwardly and outwardly from said body portion, said tab portions being adapted for engagement with one side of said support member, means including fulcrum areas disposed adjacent the juncture of said body portion with said tab portions, said fulcrum areas being disposed in spaced confronting relationship to provide outward deformation of said body portion upon pivotal movement of said tab portions toward one another, resilient leg means extending upwardly from adjacent the bottom of said body portion and disposed generally transversely thereof, said leg means being adapted for coacting engagement with the confronting surface of the other side of said support member upon said deformation of said body portion, said body portion being of a generally U-shaped configuration including oppositely disposed upper lever sections and a reduced width lower section, the upper lever sections including adjacent their lower ends generally diagonally extending edges which converge in a direction toward the juncture with said lower reduced width sections, and said edges being adapted for sliding and bearing coacting engagement with the upper ends of said leg means upon deformation of said body portion to cause outward movement of said leg means away from said body portion.

2. A fastening device in accordance with claim 1, wherein said resilient leg means includes a pair of oppositely disposed, generally vertically oriented legs made integral with and extending upwardly from adjacent the bottom of said body portion.

3. A fastening device in accordance with claim 2, wherein the free ends of said legs are angularly bent for coacting sliding engagement with the said confronting surface of said support member.

4. A fastening device in accordance with claim 1, wherein said tab portions each include laterally extending wing portions for engagement with the said confronting surafce of said support member.

5. A fastening device in accordance with claim 1, wherein reinforcing means are disposed on said tab portions and on said upper lever sections, said reinforcing means including, outwardly directed rib portions extending lengthwise thereof.

6. A fastening device in accordance with claim 1, wherein said leg means include a pair of oppositely disposed resilient legs with outwardly bent portions adjacent their free ends, and said bent portions extending generally in the same direction as the diagonal edges of said upper lever sections.

7. A fastening device in accordance with claim 1, wherein the tab portions and loop-like body portion together define a generally T-shaped configuration in side elevation.

8. A fastening device adapted for insertion in an opening in a support member, said device comprising a generally loop-like body adapted to be received through the opening in said support member, said body including oppositely disposed upper lever sections and a lower width section, a tab projecting upwardly and outwardly from each of said upper lever sections, said tabs being adapted for engagement with one side of said support member, a pair of oppositely disposed resilient legs extending upwardly from the bottom of said loop-like body and disposed generally transversely thereof, said legs being adapted for coacting engagement with the confronting surface of the other side of said support member upon outward deformation of said body, and fulcrum surfaces disposed adjacent the juncture of said tabs with said upper lever sections, said fulcrum surfaces being disposed in spaced confronting relationship to provide outward movement of said upper lever sections, deformation of said lower reduced width sections, and generally outward and upward transverse movement of the free ends of said legs upon pivotal movement of said tabs toward one another, the upper lever sections including adjacent their lower extremities generally diagonally extending side edges which converge in a direction toward the juncture with said lower reduced width sections, said edges being adapted for sliding and bearing coacting engagement with the upper free ends of said legs upon deformation of said body to cause outward movement of said legs away from said body, and wherein said legs include outwardly bent portions adjacent their free ends, said bent portions extending generally in the same direction as the diagonal edges of said upper lever sections.

9. A fastening device adapted for insertion in an opening in a support member, said device comprising a generally loop-like body adapted to be received through the opening in said support member, said body including upper sections and a closed lower section, the lower section of said loop-like body being of reduced cross-sectional strength as compared to the upper sections to permit outward deformation of said lower section, a pair of tabs extending upwardly and outwardly from said body portion, said tabs being adapted for engagement with one side of said support member, a pair of oppositely disposed resilient legs extending integrally upwardly from the lower section of said loop-like body and disposed generally transversely thereof, the free ends of said legs being adapted for coacting engagement with the confronting surface of the other side of said support member upon outward deformation of said body, fulcrum areas disposed adjacent and defining the juncture of said body with said tabs, said fulcrum areas being disposed in spaced confronting relationship to provide outward movement of said upper sections, deformation of said lower reduced width sections, and generally axially upward movement of said legs to bring the free ends thereof into abutting engagement with said confronting surface upon pivotal movement of said tabs toward one another.

10. A fastening device in accordance with claim 9, wherein said legs include outwardly bent portions adjacent their free ends.

11. A fastening device in accordance with claim 9, wherein said legs progressively increase in transverse dimension from their juncture with said body portion toward their opposite free ends.

12. A fastening device in accordance with claim 9, wherein said rib portions comprise embossments.

References Cited

UNITED STATES PATENTS 2,255,650    9/1941    Burke _____ 85—71
2,559,281    7/1951    Croessant _____ 85—71

CARL W. TOMLIN, Primary Examiner

RAMON S. BRITTS, Assistant Examiner

U.S. Cl. X.R.

24—73